United States Patent
Tsui et al.

(10) Patent No.: US 9,549,054 B2
(45) Date of Patent: Jan. 17, 2017

(54) INFORMATION DISPLAYING METHOD, MOBILE PHONE, AND STORAGE DEVICE

(75) Inventors: Yuan-Mao Tsui, Taoyuan County (TW); Ying-Ju Chen, Taoyuan County (TW); Chi-Min Lee, Taoyuan County (TW)

(73) Assignee: HTC CORPORATION, Taoyuan (TW)

( * ) Notice: Subject to any disclaimer, the term of this patent is extended or adjusted under 35 U.S.C. 154(b) by 0 days.

(21) Appl. No.: 13/415,371

(22) Filed: Mar. 8, 2012

(65) Prior Publication Data

US 2012/0220343 A1  Aug. 30, 2012

Related U.S. Application Data

(63) Continuation-in-part of application No. 13/017,478, filed on Jan. 31, 2011.

(60) Provisional application No. 61/299,347, filed on Jan. 29, 2010.

(51) Int. Cl.
| | |
|---|---|
| *H04M 3/42* | (2006.01) |
| *H04M 1/56* | (2006.01) |
| *H04M 1/57* | (2006.01) |
| *H04M 1/725* | (2006.01) |

(52) U.S. Cl.
CPC .............. *H04M 1/56* (2013.01); *H04M 1/575* (2013.01); *H04M 1/72566* (2013.01)

(58) Field of Classification Search
CPC .................. H04L 29/08108; H04M 2207/18; H04M 3/42042
USPC ............................. 455/414.1, 415, 551, 455
See application file for complete search history.

(56) References Cited

U.S. PATENT DOCUMENTS

| | | | |
|---|---|---|---|
| 8,270,954 B1 | 9/2012 | Breau et al. | |
| 2005/0057584 A1* | 3/2005 | Gruen | G06Q 10/107 715/752 |
| 2006/0246874 A1* | 11/2006 | Sullivan | 455/412.1 |
| 2007/0248221 A1* | 10/2007 | Chatterjee et al. | 379/211.02 |
| 2008/0205621 A1* | 8/2008 | Ratnakar | G06Q 10/107 379/218.01 |
| 2009/0203391 A1* | 8/2009 | Mazor et al. | 455/466 |
| 2009/0323915 A1* | 12/2009 | Sasaki | 379/112.01 |
| 2010/0153284 A1* | 6/2010 | Hoag | G06Q 10/10 705/319 |
| 2011/0274257 A1 | 11/2011 | Vaananen | |

(Continued)

FOREIGN PATENT DOCUMENTS

| | | |
|---|---|---|
| CN | 101014065 A | 8/2007 |
| CN | 101257691 A | 9/2008 |

(Continued)

OTHER PUBLICATIONS

Office Action issued by USPTO for U.S. Appl. No. 13/017,478 on Jul. 9, 2014.

(Continued)

*Primary Examiner* — Chuck Huynh
(74) *Attorney, Agent, or Firm* — Rabin & Berdo, P.C.

(57) ABSTRACT

An information displaying method, a mobile phone, and a storage device are provided. The information displaying method comprises the following steps. Whether a communication process is started is determined. If the communication process is started, then telephone number information is received. Event information is obtained according to the telephone number information. The event information is displayed.

22 Claims, 6 Drawing Sheets

(56) References Cited

U.S. PATENT DOCUMENTS

2012/0115449 A1* 5/2012 Bruchelt ...................... 455/415

FOREIGN PATENT DOCUMENTS

| CN | 101616203 A | 12/2009 |
|----|-------------|---------|
| EP | 2139209 A2 | 12/2009 |
| TW | 200704124 | 1/2007 |
| WO | WO-2008094156 A1 | 8/2008 |

OTHER PUBLICATIONS

US Office Action issued on Dec. 31, 2014 for U.S. Appl. No. 13/017,478.

* cited by examiner

INFORMATION DISPLAYING METHOD, MOBILE PHONE, AND STORAGE DEVICE

This is a continuation-in-part application of application Ser. No. 13/017,478, filed on Jan. 31, 2011, which claims the benefits of a provisional application Ser. No. 61/299,347, filed Jan. 29, 2010, and Taiwan application Serial No. 100101018, filed Jan. 11, 2011, the subject matters of which are incorporated herein by reference.

BACKGROUND

Technical Field

This disclosure relates in general to an information displaying method, a mobile phone, and a storage device, and more particularly to an information displaying method for a communication process, a mobile phone, and a storage device.

Description of the Related Art

In the open and modern society, the modern human beings have the busy life and the frequent social activities, and the phone book of each person stores contact information of several tens or even several hundreds of friends and families.

Because the friends are getting more and more, the people usually cannot remember the detail events of these friends. Therefore, during the telephone conversation process, the other side often feels unfamiliar with the one side and the relationship therebetween cannot be further promoted.

Even if some more careful persons deliberately remember the detail event of the friends, they tend to forget these details when answering or making a call.

The mobile phone is an important tool for communications between the modern human beings. In addition to the audio or voice transfer, it is an important direction of research to provide a more human-oriented function for the user to promote the relationships between the user and his/her friends.

SUMMARY

This disclosure is directed to an information displaying method, a mobile phone and a storage device for promoting the relationship between the user and the friend according to the human-oriented reminder function of the event information.

According to a first aspect of the present disclosure, an information displaying method is provided. The method comprises the following steps. Whether a communication process is started is determined. A telephone number information is received if the communication process is started. An event information is obtained according to the telephone number information. The event information is displayed.

According to a second aspect of the present disclosure, a storage device is provided. An electronic device loads the storage device to execute an information displaying method, which comprises the following steps. Whether a communication process is started is determined. A telephone number information is received if the communication process is started. An event information is obtained according to the telephone number information. The event information is displayed.

According to a third aspect of the present disclosure, a mobile phone comprising a communication unit, a storage unit, a processing unit, and a display unit is provided. The storage unit stores a plurality of sets of telephone number information and at least one event information. The processing unit determines whether the communication unit starts a communication process. If the communication unit starts the communication process, the processing unit receives one of the sets of the telephone number information, and obtains the corresponding event information from the storage unit according to the telephone number information. The display unit displays the event information.

According to a fourth aspect of the present disclosure, an information displaying method is provided. The method comprises the following steps. An inputting window for inputting a task information is provided. The task information is recorded and the task information is linked to a telephone number information. Whether a communication process is started is determined. The telephone number information corresponding to the communication process is received if the communication process is started. The task information is obtained according to the received telephone number information if the received telephone number information is matched to the linked telephone number information. The task information is displayed.

According to a fifth aspect of the present disclosure, a storage device is provided. An electronic device loads the storage device to execute an information displaying method. The method comprises the following steps. A contact information list is provided, wherein the contact information comprises a telephone number information. An inputting window for inputting a task information is provided. A menu for selecting a contact information from the contact information list is provided. The task information is stored and linked to the selected contact information. The telephone number information corresponding to the communication process is received when the communication process is started. The task information is obtained according to the received telephone number information if the received telephone number information is matched to the telephone number information of the selected contact information. The task information is displayed.

According to a sixth aspect of the present disclosure, a mobile phone is provided. The mobile phone comprises a communication unit, a storage unit, a processing unit, and a display unit. The storage unit is for storing a plurality of contact information and at least one task information. Each contact information comprises a telephone number information. The processing unit is for linking the task information to one or more of the contact information and determining whether the communication unit starts a communication process. If the communication unit starts the communication process, the processing unit receives the telephone number information corresponding to the communication process, and obtains the corresponding task information from the storage unit according to the received telephone number information if the received telephone number information is matched to the telephone number information of the linked contact information. The display unit is for displaying the obtained task information.

According to a seventh aspect of the present disclosure, an information displaying method of a mobile phone is provided. The method comprises the following steps. Whether a communication process is started is determined. A plurality of event information are received from a social network service and stored in the mobile phone. A telephone number information is received if the communication process is started. The stored event information corresponding to the received telephone number information is displayed. The step of receiving a plurality of the event information comprises the following steps. The social network service is connected to receive the information of a predetermined number of latest event information. The latest event information is stored and the received event information is correspondingly linked to one or more telephone number information.

In one embodiment of the method of the seventh aspect of the present disclosure, a plurality of telephone numbers is provided, and wherein one or more of the obtained latest event information is correspondingly linked to one or more of the telephone numbers.

In one embodiment of the method of the seventh aspect of the present disclosure, a plurality of contact information is provided, and wherein one or more of the obtained latest event information is correspondingly linked to one or more of the contact information. In another one embodiment, wherein the linked event information is displayed in a contact information list comprising the correspondingly linked contact information.

The above and other aspects of the disclosure will become better understood with regard to the following detailed description of the non-limiting embodiment(s). The following description is made with reference to the accompanying drawings.

DETAILED DESCRIPTION

First Embodiment

Figure 1:
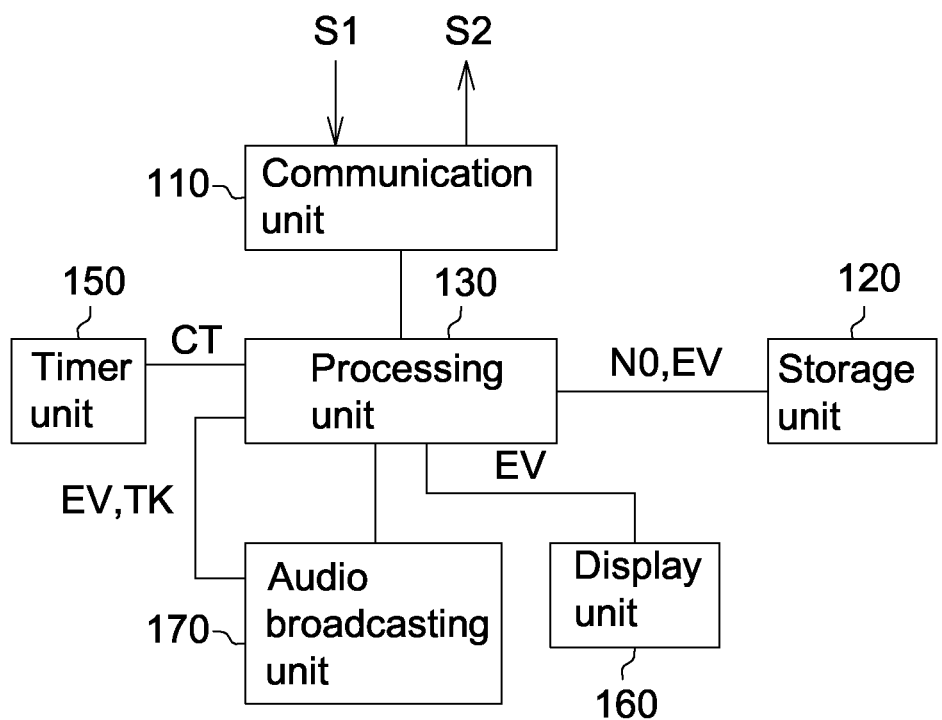
FIG. 1 is a block diagram showing a mobile phone according to a first embodiment of this disclosure.

FIG. 1 is a block diagram showing a mobile phone 100 according to a first embodiment of this disclosure. Referring to FIG. 1, the mobile phone 100 comprises a communication unit 110, a storage unit 120, a processing unit 130, and a display unit 160. The communication unit 110, such as a combination of an antenna and a radio frequency chip, receives or transmits radio information. The storage unit 120 stores various kinds of information, and may be a single element or two or more than two separate elements. For example, the storage unit 120 is a device, such as a memory, a hard drive or a memory card, capable of storing various sets of information, and may also be a remotely connected storage element or device. The processing unit 130, such as a micro-processing chip, a firmware circuit or a recording medium storing several sets of program codes, performs various determined procedures or computation procedures. The processing unit 130 further receives various kinds of information. In this embodiment, the processing unit 130 receives information from the storage unit 120, and comprises a transmission line, a connection port or a card reader, for example. The display unit 160, such as a liquid crystal display (LCD) panel, an organic light emitting diode (OLED) panel, a touch screen or E-paper, displays various kinds of information. In one embodiment, the mobile phone 100 may also comprise a timer unit 150 and an audio broadcasting unit 170. The timer unit 150, such as a timer chip, detects a current time. The audio broadcasting unit 170, such as a loudspeaker, broadcasts various information with an audio.

Figure 2:
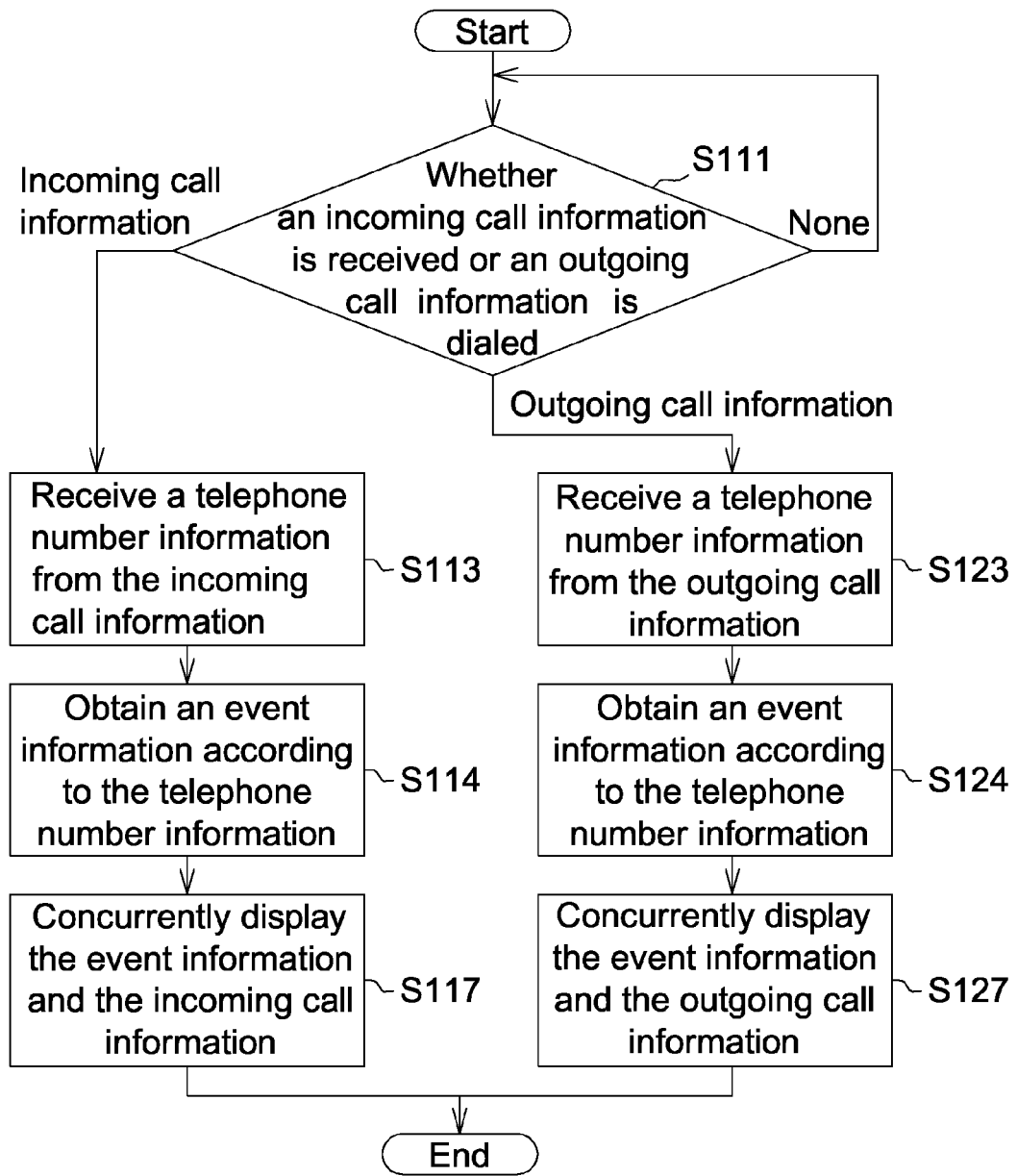
FIG. 2 is a flow chart showing an information displaying method according to the first embodiment.

FIG. 2 is a flow chart showing an information displaying method according to the first embodiment. In order to describe the operations of various elements and the information displaying method of this embodiment clearly, a flow chart will be described in the following. However, those skilled in the art may easily understand that the displaying method of this embodiment is neither restricted to the application of the mobile phone 100 of FIG. 1 nor restricted to the order of the steps in the flow chart.

First, in step S111, the processing unit 130 determines whether the communication unit 110 starts a communication process, such as a process of receiving an incoming call information S1 or a process of dialing an outgoing call information S2. If the communication unit 110 has received the incoming call information S1, step S113 is entered. If the communication unit 110 has dialed the outgoing call information S2, step S123 is entered. If the communication unit 110 does not receive the incoming call information S1 and does not dial the outgoing call information S2, the process returns to the step S111.

In the step S113, the processing unit 130 receives a telephone number information NO from the incoming call information S1.

Next, in step S114, the processing unit 130 obtains a corresponding event information EV from the storage unit 120 according to the telephone number information NO. The event information EV comprises, for example, an event occurrence time, an event associated information, or an event associated content. The event information EV comprises, for example but without limitation to, a last short message, a last e-mail, a last incoming call, a last missed call, a latest event of a personal webpage, or a latest event of a social network service. The social network service is, for example, Facebook, Twitter, Plurk, or the like.

Then, in step S117, the display unit 160 concurrently displays the associated information of the event information EV and the incoming call information S1. The associated information of the incoming call information S1 comprises, for example, a phone number of a caller, a corresponding name of the caller, or an image of the caller.

On the other hand, the steps S123, S124, and S127 are similar to the steps S113, S114, and S117. In the step S123, the processing unit 130 receives the telephone number information NO from the outgoing call information S2. In the step S127, the display unit 160 concurrently displays the event information EV and the outgoing call information S2.

It is to be noted that the information displaying method may be independently applied to the process of receiving the incoming call information S1 or dialing the outgoing call information S2.

The information displaying method may also be executed through a computer program, which may be loaded from a storage device.

Furthermore, in another embodiment, the steps S117 and S127 may be performed when the communication process is proceeding.

Second Embodiment

Figure 3:
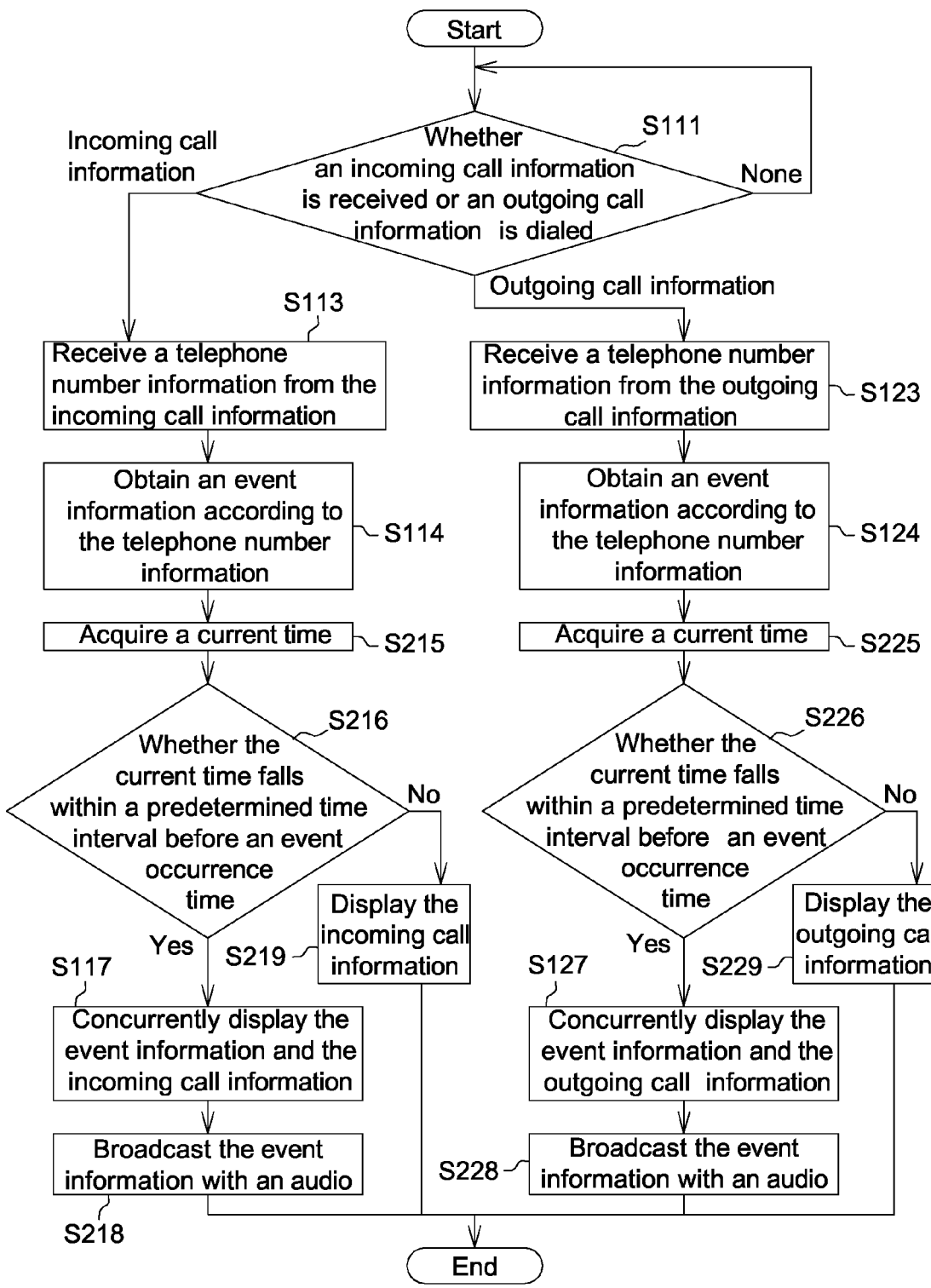
FIG. 3 is a flow chart showing an information displaying method according to a second embodiment.

FIG. 3 is a flow chart showing an information displaying method according to a second embodiment. The difference between the information displaying methods of the second and first embodiments resides in that the information displaying method of the second embodiment further comprises steps S215, S216, S218, S219, S225, S226, S228, and S229, wherein the other steps are the same as those of the first embodiment and will not be repeatedly described.

After the step S114, the processing unit 130 has obtained the corresponding event information EV.

Then, in the step S215, the timer unit 150 detects a current time CT.

Next, in the step S216, the processing unit 130 determines whether the current time CT falls within a predetermined time interval before the event occurrence time. The predetermined time interval may be, for example, three days, one week, or one month, and may be selected or set by the user. If the current time CT falls within the predetermined time interval, the step S117 is entered. If the current time CT does not fall within the predetermined time interval, the step S219 is entered. For example, when the event information EV is the birthday information, the associated information only needs to be displayed to inform the user when the birthday of the caller or answerer is almost approaching.

Similarly, the processing unit 130 may also determine whether the current time CT falls within a predetermined time interval after the event occurrence time, depending on the product requirement. For example, when the event information EV is the latest event of the social network service of the caller or the answerer, the associated information only needs to be displayed to inform the user within a predetermined period of time after the event occurs without continuously informing the user after a long period of time.

Then, in the step S117, the display unit 160 concurrently displays the associated information of the event information EV and the incoming call information S1. The associated information of the incoming call information S1 comprises, for example, the phone number of the caller, the corresponding name of the caller, or the corresponding image of the caller.

In the step S219, the display unit 160 displays the incoming call information S1. In the step S219, the display unit 160 may further display the associated information of the incoming call information S1, which comprises, for example, the phone number of the caller, the corresponding name of the caller, or the corresponding image of the caller.

In one embodiment, the audio broadcasting unit 170 may play the event information EV with the audio in the step S218.

In another embodiment, the steps S225, S226, S228, and S229 are similar to the steps S215, S216, S218, and S219. In the step S129, the display unit 160 displays the associated information of the outgoing call information S2, which comprises, for example, the dial number, the corresponding name of the answerer, or the corresponding image of the answerer. It is to be noted that the information displaying method may be independently applied to the process of receiving the incoming call information S1 or dialing the outgoing call information S2.

In addition, in one embodiment, the steps S117 and S218 may be performed concurrently, and the steps S127 and S228 may also be performed concurrently according to the product requirement.

Third Embodiment

Figure 4:
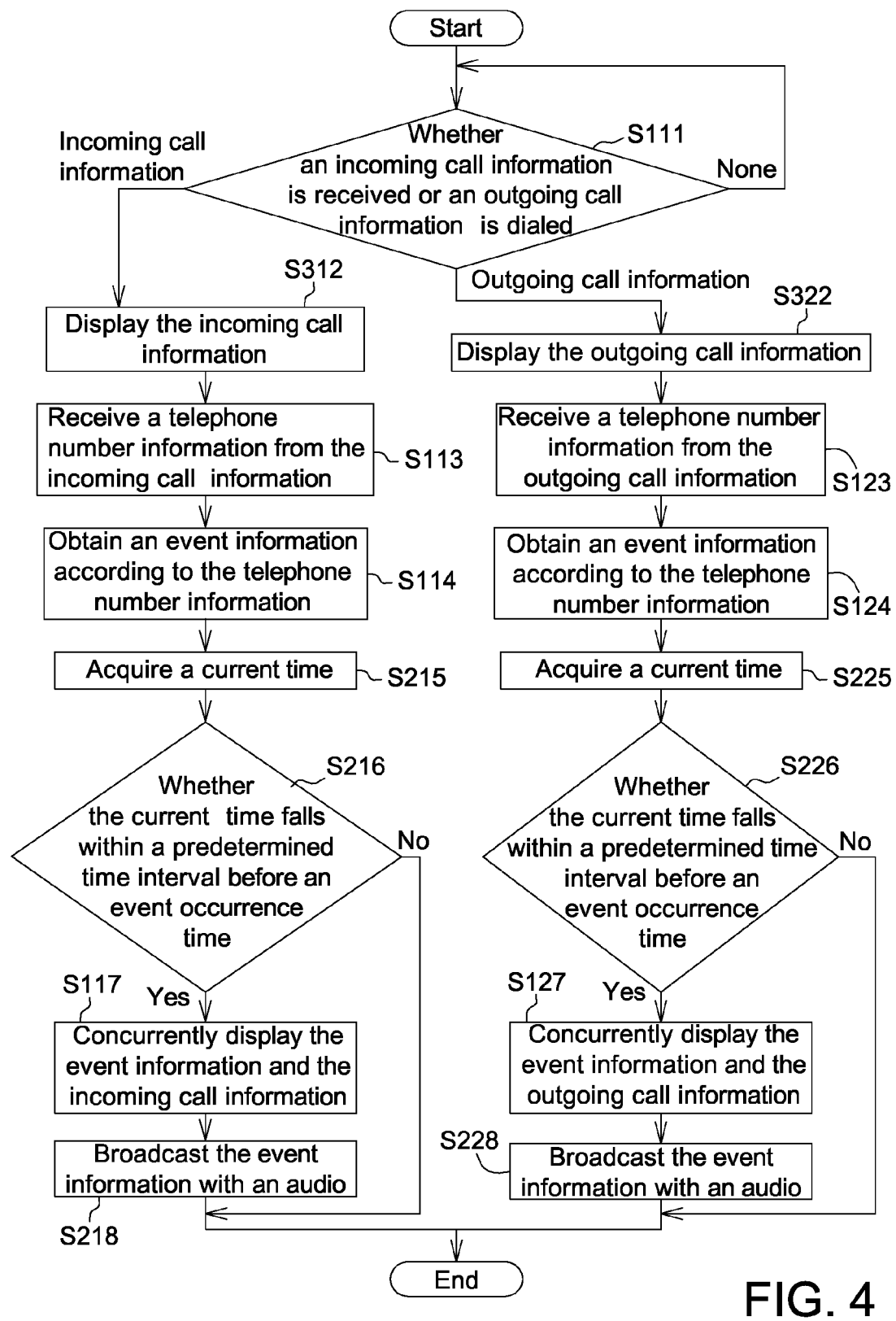
FIG. 4 is a flow chart showing an information displaying method according to a third embodiment.

FIG. 4 is a flow chart showing an information displaying method according to a third embodiment. The mobile phone 100, the information displaying method and the storage device of this embodiment are different from those of the second embodiment in that the information displaying method of this embodiment has the newly added steps S312 and S322, and the steps S219 and S229 are cancelled. The other common features will be omitted.

First, in the step S111, the processing unit 130 determines whether the communication unit 110 starts the communication process, which is, for example, the processing of receiving the incoming call information S1, or whether the communication unit 110 has dialed the outgoing call information S2. If the communication unit 110 has received the incoming call information S1, then the step S312 is entered. If the communication unit 110 has dialed the outgoing call information S2, then the step S322 is entered. If the communication unit 110 has not received the incoming call information S1 and has not dialed the outgoing call information S2, then the process goes back to the step S111.

In the step S312, the display unit 160 displays the incoming call information S1.

Then, after the steps S113, S114, and S215, the step S216 is entered.

In the step S216, the processing unit 130 determines whether the current time CT falls within the predetermined time interval before the event occurrence time. If the current time CT falls within the predetermined time interval, then the step S117 is entered. If the current time CT does not fall within the predetermined time interval, then the process ends.

Similarly, on the other hand, the display unit 160 displays the outgoing call information S2 in the step 322. Also, in the step S226, if the current time CT does not fall within the predetermined time interval, this process may also end.

According to the above-mentioned processes, this embodiment firstly displays the incoming call information S1 or the outgoing call information S2, and then performs the steps S113, S114, S215, S216, S117, S218 or the steps S123, S124, S225, S226, S127, S228. The event information EV is displayed or the event information EV is broadcasted if necessary. Consequently, it is possible to prevent the processing time of the steps S113, S114, S215, S216, S117, S218 or the steps S123, S124, S225, S226, S127, S228 from affecting the fluency of dialing or answering the phone call.

Furthermore, in one embodiment, the steps S117 and S127 may be performed when the communication process is proceeding.

In addition, the steps S215, S216, S218 may be omitted in one embodiment, and the step S117 is directly performed after the step S114. The steps S225, S226, S228 may be omitted, and the step S127 is directly performed after the step S124.

Through the above-mentioned elements and steps, when the user is answering or making a call, the user can immediately know whether the other side has some events, such as the birthday reminder, the reminder of the date with the other side, the recent event or thoughts of the other side, or the contact time, manner, content or the like between the other side and the user. The user can immediately bless the other side, or discuss the date event or the recent condition of the other side on the phone, to shorten the distance between each other.

Figure 5:
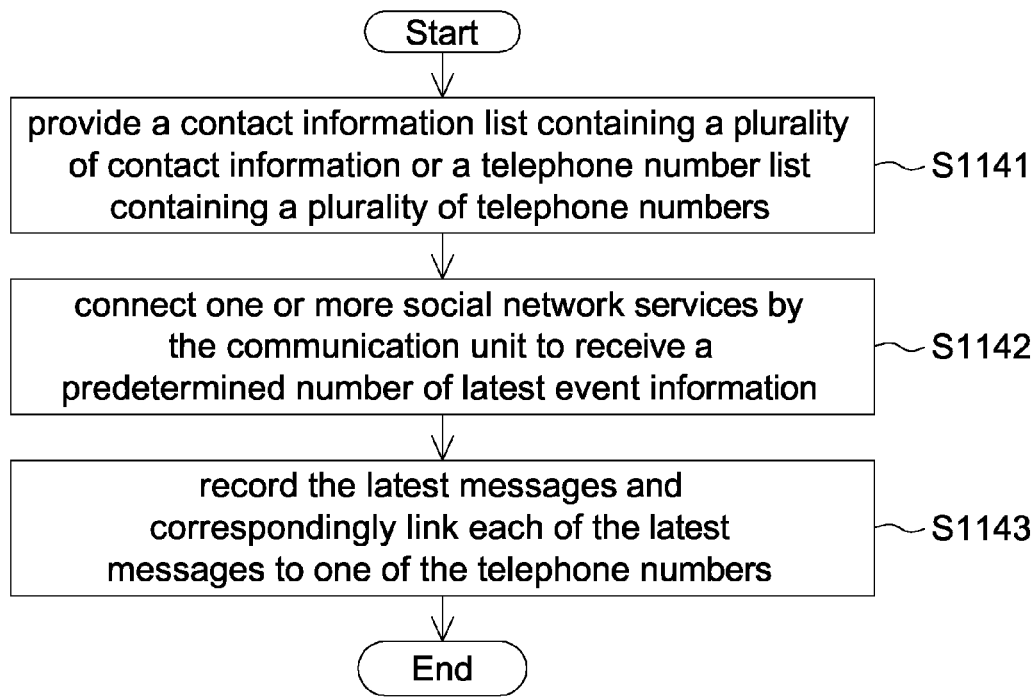
FIG. 5 shows several detailed steps of the step S114 or the step S124 in FIG. 2.

Further, please refer to FIG. 5, which shows several detailed steps of the step S114 or the step S124 in FIG. 2. The step S114 or S124 may be performed by the following steps.

In the step S1141, a contact information list containing a plurality of contact information or a telephone number list containing a plurality of telephone numbers is provided.

In the step S1142, one or more social network services are connected by the communication unit 110 (shown in FIG. 1)

to receive a predetermined number of latest event information The predetermined number may be, for example, 100, 250, or 300.

In the step S1143, the latest event information is stored and some or all the received latest event information is correspondingly linked to one or more of the contact information or telephone numbers. In one embodiment, some of the received event information may not be linked to any of the contact information or telephone numbers.

In one embodiment, the content or partial content of the correspondingly linked event information may be displayed in a contact information list, wherein each of the displayed event information is displayed in a window showing the contact information correspondingly linked to the displayed event information or in another window next to the window showing the contact information correspondingly linked to the displayed event information in the contact information list.

wherein the contact of the event information the contact list comprising some or all of the correspondingly linked contact information.

Moreover, in another embodiment of the information displaying method showed in FIG. 2, wherein the event information is a task information TK. In the steps S114 and S124, the task information TK is obtained according to the telephone number information NO. The task information TK is used for reminding the user to ask the caller or the receiver to do something, such as asking the caller or the receiver to do a job, attending an important meeting, etc. or discussing with the caller or receiver about a task.

Figure 6:
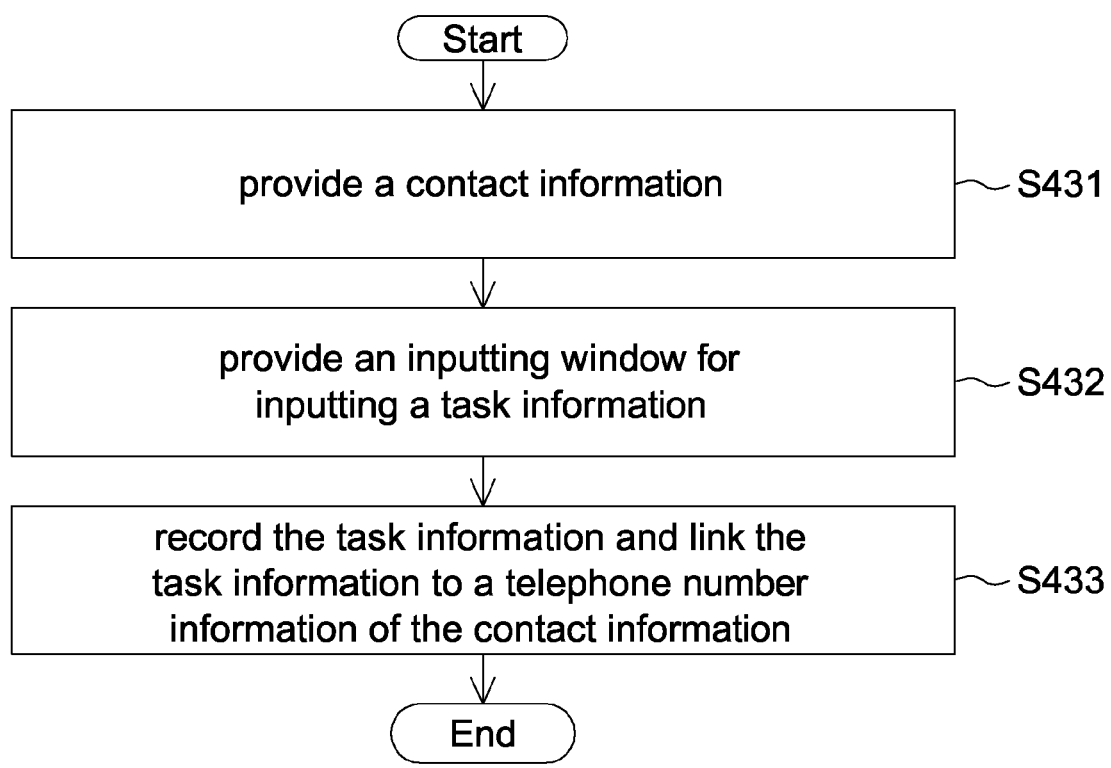
FIG. 6 shows an information displaying method of the mobile phone for creating the task information.

Please refer to FIG. 6, which shows an information displaying method of the mobile phone 100 for creating the task information TK. In step S431, the contact information NO is provided. In this step, the contact information may be provided by providing a contact information list for the user to select one or more contact information in the contact information list. The contact information may contain one or more telephone number information. Although some contact information in the contact list may not contain telephone number information, these contact information may able to be linked to the task information.

In step S432, an inputting window for inputting the task information TK is provided. The user may input the task information TK by typing, hand writing, or selecting a task from a default task information list.

In the step S433, the task information TK is stored and the task information TK is linked to the contact information and/or the telephone number information NO. In one embodiment, the task information TK may be linked to the contact information by linking to the telephone number information NO corresponding to the contact linked contact information. In one embodiment, the task information TK may be directly linked to one or more of the telephone number information NO, and the telephone number information NO may be selected by the user by selecting from telephone number information NO list.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A mobile phone, comprising:
   a communication unit;
   a storage unit for storing a plurality of sets of telephone number information, each set of the telephone number information corresponding to a respective person;
   a processing unit that provides an inputting window for inputting a task information including a task to be performed and a menu for selecting one of the sets of the telephone number information to link to the inputted task information, wherein the task information is corresponding to a Facebook event, the processing unit stores the task information into the storage unit and links the task information to the selected set of telephone number information, the linked task information includes the task to be performed by the person corresponding to the selected set of telephone number information, the inputting window is different from the menu, the sets of the telephone number information are shown on the menu for selection and are not shown in the inputting window, and the inputting window and the menu are shown at different times; and
   a display unit, wherein if the communication unit starts a call communication process and the processing unit receives an incoming telephone number information corresponding to the call communication process, and the received incoming telephone number information corresponding to the call matches one of the selected set of the telephone number information linked to the inputted task information, the display unit displays the linked task information during a call conversation process.

2. The mobile phone according to claim 1, wherein the call communication process comprises receiving an incoming call information, the display unit further displays the incoming call information, the display unit firstly displays the incoming call information and then displays the task information.

3. The mobile phone according to claim 1, wherein the call communication process comprises receiving an incoming call information, and the display unit concurrently displays the incoming call information and the task information.

4. The mobile phone according to claim 1, wherein the call communication process comprises receiving an outgoing call information, the display unit further displays the outgoing call information, wherein the display unit firstly displays the outgoing call information and then displays the task information.

5. The mobile phone according to claim 1, wherein the call communication process comprises receiving an outgoing call information, and the display unit concurrently displays the outgoing call information and the task information.

6. The mobile phone according to claim 1, wherein the task information is linked to multiple sets of the contact information.

7. The mobile phone according to claim 1, wherein the processing unit further broadcasts the linked task information with an audio.

8. The mobile phone according to claim 1, wherein the processing unit further provides a contact list including the plurality of sets of the telephone number information.

9. An information displaying method, comprising the steps of:
   providing an inputting window for inputting a task information, the task information including a task to be performed;
   providing a menu for selecting one of a plurality of sets of telephone number information to link to the inputted task information, wherein each set of the telephone number information corresponds to a respective person, and the task information is corresponding to a Facebook event;

storing the task information and linking the task information to the selected set of telephone number information, wherein the linked task information includes the task to be performed by the person corresponding to the selected set of telephone number information;

determining whether a call communication process is started;

receiving an incoming telephone number information corresponding to the call communication process in response to determining that the call communication process is started;

obtaining the task information according to the received incoming telephone number information corresponding to the call communication process in response to determining the received incoming telephone number information corresponding to the call matches one of the selected set of telephone number information linked to the inputted task information; and displaying the linked task information, during a call conversation process, wherein the inputting window is different from the menu, the sets of the telephone number information are shown on the menu for selection and are not shown in the inputting window, and the inputting window and the menu are shown at different times.

10. The method according to claim 9, wherein the task information is linked to multiple sets of the telephone number information.

11. The method according to claim 9, wherein the call communication process comprises receiving an incoming call information, and the method further comprises the step of:

displaying the incoming call information;

wherein the step of displaying the incoming call information is performed before the step of displaying the task information.

12. The method according to claim 9, wherein the call communication process comprises dialing an outgoing call information, and the method further comprises the step of:

displaying the outgoing call information;

wherein the step of displaying the outgoing call information is performed before the step of displaying the task information.

13. The method according to claim 9, further comprising the step of:

broadcasting the linked task information with an audio.

14. The method according to claim 9, further comprising the step of:

providing a contact list including the plurality of sets of the telephone number information.

15. The method according to claim 9, wherein the call communication process comprises receiving an incoming call information, and the method further comprises the step of:

displaying the incoming call information;

wherein the step of displaying the incoming call information and the step of displaying the task information are performed concurrently.

16. The method according to claim 9, wherein the call communication process comprises dialing an outgoing call information, and the method further comprises the step of:

displaying the outgoing call information;

wherein the step of displaying the outgoing call information and the step of displaying the task information are performed concurrently.

17. A storage device, wherein an electronic device loads the storage device to execute an information displaying method, comprising the steps of:

providing an inputting window for inputting a task information, the task information including a task to be performed, wherein the task information is corresponding to a Facebook event;

providing a menu for selecting one of a plurality of sets of telephone number information to link to the inputted task information, wherein each set of the telephone number information corresponds to a person;

storing the task information and linking the task information to the selected set of telephone number information, and wherein the linked task information includes a task to be performed by the person corresponding to the selected set of telephone number information;

determining whether a call communication process is started;

receiving an incoming telephone number information corresponding to a call communication process in response to determining that the call communication process has started;

obtaining the task information according to the received incoming telephone number information corresponding to the call communication process in response to determining that the received incoming telephone number information corresponding to the call communication process matches one of the selected set of telephone number information linked to the inputted task information; and displaying the linked task information during a call conversion process, wherein the inputting window is different from the menu, the sets of the telephone number information are shown on the menu for selection and are not shown in the inputting window, and the inputting window and the menu are shown at different times.

18. The storage device according to claim 17, further comprising the step of:

broadcasting the linked task information with an audio.

19. The storage device according to claim 17, wherein the task information is linked to multiple sets of the telephone number information.

20. The storage device according to claim 17, further comprising the step of:

providing a contact list including the plurality of sets of the telephone number information.

21. The storage device according to claim 17, wherein the call communication process comprises receiving an incoming call information, and the method further comprises the step of:

displaying the incoming call information;

wherein the step of displaying the incoming call information and the step of displaying the task information are performed concurrently.

22. The storage device according to claim 17, wherein the call communication process comprises dialing an outgoing call information, and the method further comprises the step of:

displaying the outgoing call information;

wherein the step of displaying the outgoing call information and the step of displaying the task information are performed concurrently.

* * * * *